United States Patent Office 3,446,436
Patented May 27, 1969

3,446,436
ROCKET THRUST NOZZLE SYSTEM
Stanley P. Desjardins and Charles H. Wright, Brigham City, Utah, assignors to Thiokol Chemical Corporation, Bristol, Pa., a corporation of Delaware
Filed Nov. 29, 1966, Ser. No. 597,698
Int. Cl. B64c 16/08, 15/10
U.S. Cl. 239—265.25                   6 Claims

ABSTRACT OF THE DISCLOSURE

A rocket motor having; a primary thrust nozzle provided with a rearwardly convergent exterior surface, and a plurality of secondary thrust nozzles disposed around the primary nozzle so that gas discharged from the secondary nozzles is directed against the rearwardly converging surface of said primary nozzle. The converging surface serves as a truncated plug for the secondary nozzles and thereby provides more efficient expansion of gas therefrom. Means is also provided to obtain rocket motor thrust vectoring and roll control.

---

This invention relates to rocket motors and more particularly to an improved thrust nozzle system for rocket motors.

One of the problems heretofore encountered in the use of multiple thrust nozzles on rocket motors results from the flow of a portion of the gas discharged from such nozzles toward the casing, or casings, on which they are mounted. This flow of gas toward the base area of a multiple thrust nozzle system (which is referred to as "base flow" in rocket motor terminology) requires the use of heavy insulation to protect the heated area. In addition, conventional rockets are subject to base drag resulting from decreased pressure in the base area thereof, which in turn results from free stream air expansion and flow in this region. Previously available multiple thrust nozzle systems have not been entirely satisfactory with respect to their ability to provide effective thrust vector control in a rocket motor, and have also been defficient in that they have not provided optimum expansion of thrust gases throughout the trajectory of a rocket motor within the atmosphere.

Accordingly, it is a broad object of this invention to provide an improved multiple thrust nozzle system for rocket motors.

Another object of this invention is to provide a multiple thrust nozzle system for rocket motors by means of which thrust vectoring and roll control can be accomplished, said system being uncomplicated in design and light in weight.

An additional object of this invention is to increase the thrust of a rocket motor having multiple thrust nozzles while also providing improved thrust vector control therefor.

The above and other objects of the present invention are achieved by means of several embodiments thereof, each of said embodiments comprising a rocket motor having a primary thrust nozzle mounted on the aft end of the casing (or casings, where said rocket motor is formed of a plurality of rocket motors fixedly connected together in a cluster) thereof, said primary thrust nozzle being provided with a rearwardly convergent exterior surface, and said rocket motor also having a plurality of secondary thrust nozzles disposed around said primary thrust nozzle, gas discharged from said secondary thrust nozzles being directed against said rearwardly convergent surface of said primary thrust nozzle.

The invention is disclosed in further detail in the following specification, in which reference is made to the accompanying drawings, wherein:

FIGURE 3 is a pictorial view of a second, preferred embodiment of the invention, said embodiment comprising a central thrust nozzle with a rearwardly convergent exterior surface and a plurality of rotatable secondary thrust nozzles spaced around said primary thrust nozzle;

Figure 5:
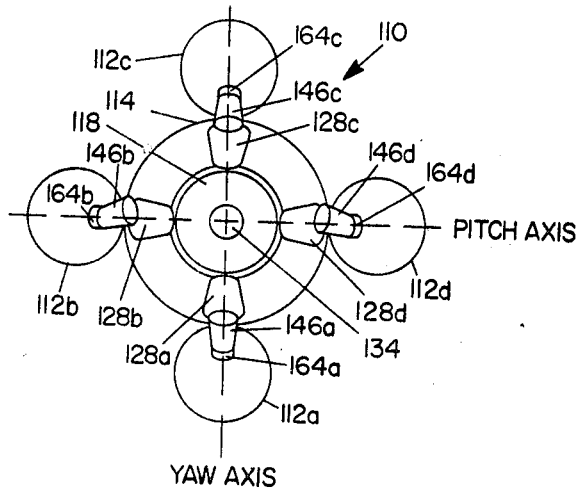
Figure 6:
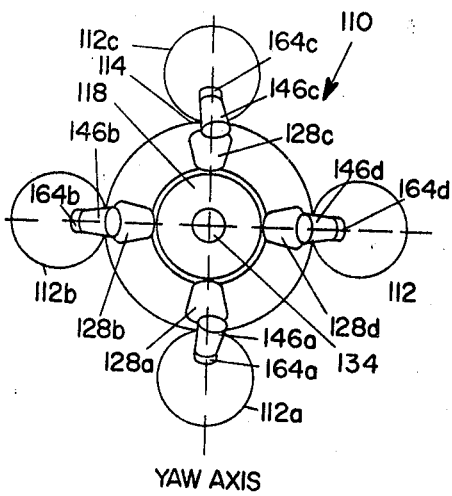
Figure 7:
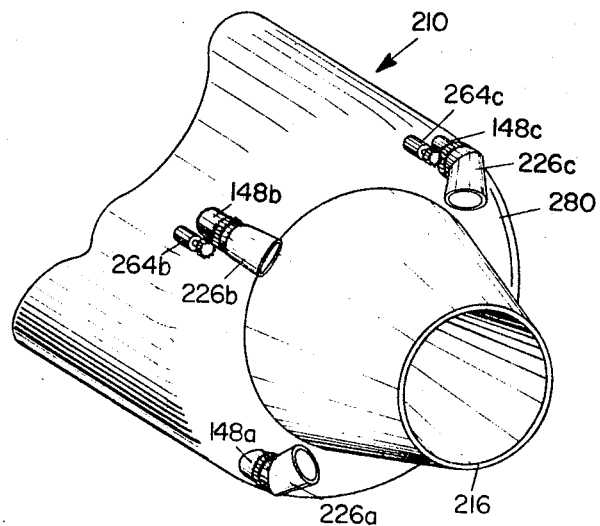

FIGURE 4 is a longitudinal sectional view of a portion of the embodiment illustrated in FIGURE 3, taken in the indicated direction along the plane represented by line 4—4 in that drawing and illustrating a typical one of the devices which are employed to rotate the secondary thrust nozzles of said embodiment; and FIGURES 5 and 6 are end views of the embodiment illustrated in FIGURE 3, certain of the secondary thrust nozzles thereof being rotated to different positions in the drawings in order to illustrate the manner in which directional control of a rocket motor can be effected by said embodiment; and FIGURE 7 is a pictorial view of a third embodiment of the invention.

Throughout the specification and drawings, the same reference numbers refer to the same parts.

Figure 1:
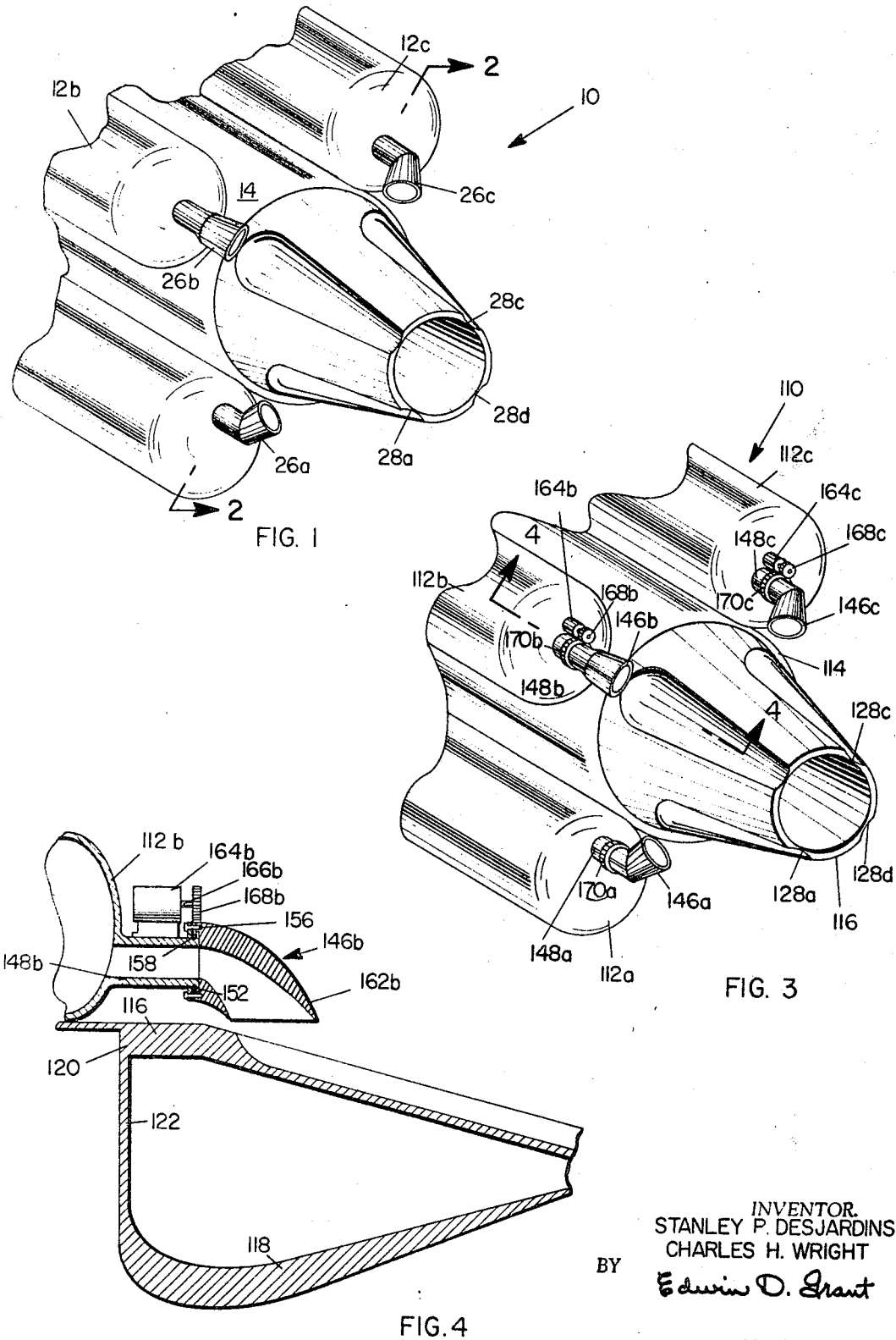
FIGURE 1 is a pictorial view of one embodiment of the invention, said embodiment comprising a central or primary thrust nozzle with a rearwardly convergent exterior surface and a plurality of secondary thrust nozzles fixedly spaced around said primary thrust nozzle.
Figure 2:
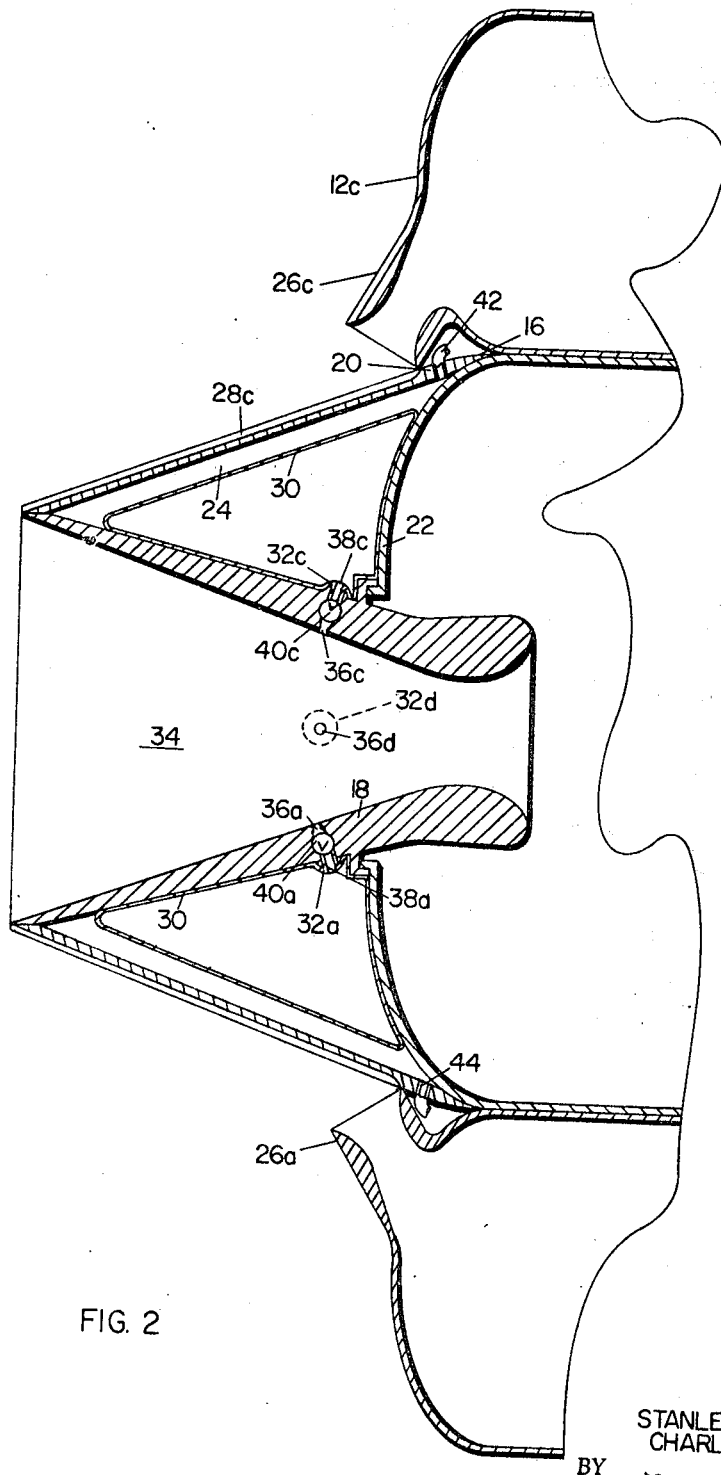
FIGURE 2 is a longitudinal sectional view of a portion of the embodiment illustrated in FIGURE 1, taken in the indicated direction along the plane represented by line 2—2 in that drawing and illustrating a typical one of the thrust vector control injectors of said embodiment.

The embodiment of the invention illustrated in FIGURE 1 is incorporated in a rocket motor, generally designated by number 10, formed of four booster rocket motors 12a–12d disposed around and fixedly connected to a central rocket motor 14. A primary thrust nozzle 16 is fixedly mounted on the aft end of rocket motor 14, said primary thrust nozzle being provided with a rearwardly convergent exterior surface. More particularly, as illustrated in FIGURE 2, primary thrust nozzle 16 comprises an inner wall 18 which forms a convergent-divergent thrust nozzle for rocket motor 14 and an outer wall 20 which defines said rearwardly convergent surface of said primary thrust nozzle. The forward ends of walls 18, 20 are integrally joined to a radially extending section 22 of the casing of rocket motor 14, and the aft ends of said walls are integrally joined together to thereby provide a closed, annular chamber 24 in primary thrust nozzle 16.

Fixedly mounted on the aft end of each of the booster rocket motors 12a–12d is a secondary thrust nozzle 26a–26d (one of which is hidden from view in FIGURE 1). These secondary thrust nozzles are contoured so that gas discharged therefrom is directed against the rearwardly convergent exterior surface of thrust nozzle 16. More particularly, gas discharged from each of the secondary thrust nozzles is directed against the surface of a respective one of four gas expansion channels 28a–28d formed in outer wall 20 of primary thrust nozzle 16, each of said channels extending longitudinally of said primary thrust nozzle from a point adjacent a respective one of the secondary thrust nozzles 26a–26d to the aft end of said primary thrust nozzle.

As illustrated in FIGURE 2, a flexible, annular bladder 30 is disposed within chamber 24 of primary thrust nozzle 16, said bladder conformably abutting inner wall 18 of said primary thrust nozzle and section 22 of the casing of rocket motor 10 but being spaced from outer wall 20 of said primary thrust nozzle. Bladder 30 is filled with a liquid such as $N_2O_4$ prior to the operation of rocket motor 10. Primary thrust nozzle 16 includes four integral valve housings 32a–32d (two of which are illustrated in cross-sectional view and one of which is represented by broken lines in FIGURE 2) which are evenly spaced around the inner wall 18 thereof and equidistant from the throat of the gas discharge passage 34 therein. An injection passage 36a–36d extends through inner wall 18 and each valve housing 32a–32d, this passage communicating with the interior of bladder 30 through a tube 38a–38d integrally connected to said bladder and fixedly positioned within the inner end of said passage. Disposed in each injection passage 36a–36d is a flow control valve 40a–40d that can be actuated by conventional means (not shown) to open or close said injection passage. If desired, more than four valve assemblies can be provided so that thrust vector control can be more conveniently effected in different planes. One end of a conduit 42 is fixedly positioned within an aperture 44 formed in outer wall 20 of primary thrust nozzle 16, the other end of said conduit being connected to conventional means (not shown) for injecting air or other gas into chamber 24 of said primary thrust nozzle under pressure. For example, chamber 24 can be pressurized with gas from the combustion chamber of rocket motor 14.

The above-described components can obviously be made of many different materials well-known to persons skilled in the art of rocket motors. Preferably primary thrust nobble 16 and secondary thrust nozzles 26a–26d are made of heat-resistant materials such as tungsten alloys, graphite and ablatives such as carbon, graphite, silica and glass phenolics. Bladder 30 is made of a suitable polymeric material such as Buna N rubber. The inner wall 18 of primary thrust nozzle 16 and section 22 of the casing of rocket motor 10 are heated to a high temperature by thrust gas during the operation of said rocket motor but the structure and external surfaces remain cool because of nozzle insulation. Bladder 30 and its contents therefore remain cool during operation of motor 14.

In the described embodiment of the invention, central rocket motor 14 and booster rocket motor 12a–12d are provided with solid propellant charges (not shown) which, when ignited, produce thrust gas that is discharged from primary thrust nozzle 16 and secondary thrust nozzles 26a–26d respectively. The exterior surface of primary thrust nozzle 16 (more specifically, gas expansion channels 28a–28d) serves as an expansion surface for gas discharged from secondary thrust nozzles 26a–26d, while the inner wall 18 of primary thrust nozzle 16 forms a convergent-divergent nozzle, as mentioned hereinbefore. Thus primary thrust nozzle 16 not only provides a convergent-divergent thrust nozzle but also functions as a truncated plug for secondary thrust nozzles 26a–26d.

During the operation of rocket motor 10, the annular space 24 between outer wall 20 of primary thrust nozzle 16 and bladder 30 is pressurized by air or other gas injected through conduit 42. When change in the flight direction of rocket motor 10 is desired, one or more of the valves 40a–40d can be actuated to open the passage 36a–36d associaated therewith, whereupon liquid from bladder 30 will be injected into gas discharge passage 34 at selected points on the periphery thereof. As will be understood by persons skilled in the art of rocket motor thrust vector control by the method of secondary injection, lateral forces will thus be applied against primary thrust nozzle 16 to turn rocket motor 10. It will also be recognized that thrust vector control injectors can be mounted on the outer wall 20 of primary thrust nozzle 16 and arranged so that liquid contained between the inner and outer walls of said thrust nozzle can be selectively injected into the gas streams discharged from secondary thrust nozzles 26a–26d. By proper positioning of injection orifices, roll control of rocket motor 10 can also be achieved.

The components of the preferred embodiment of the invention illustrated in FIGURES 3, 4, 5 and 6 are similar to those of the above-described embodiment and consequently are designated by reference numbers differing from those of the first embodiment by 100. However, as will be noted by inspection of FIGURE 4, rocket motor 110 is not provided with a bladder and associated means for thrust vector control by means of secondary injection. Instead, each booster rocket motor 112a–112d is provided with rotatable secondary thrust nozzles, generally designated by reference numbers 146a–146d. More specifically, as illustrated in FIGURE 4, a duct 148a–148d is fixedly connected to the aft end of each booster rocket motor 112a–112d so as to communicate with the interior thereof, the longitudinal axis of said duct being parallel to the common longitudinal axis of central rocket motor 114 and primary thrust nozzle 116 and the aft end of said duct being formed with a radially projecting flange 150a–150d. Each secondary thrust nozzle 146a–146d contains a counterbore 152a–152d at its forward end, within which is seated a respective one of the flanges 150a–150d. A ring 154a–154d is fixedly secured to the forward end of each secondary thrust nozzle 146a–146d by means of a plurality of screws 156, a plurality of bearings 158 being disposed between said ring and the adjacent flange 150a–150d. It will also be seen in FIGURE 4 that each secondary thrust nozzle 146a–146d comprises a throat portion 160a–160f and an exit cone 162a–162d disposed at an angle to said throat portion.

Fixedly mounted on each duct 148a–148d is an electric motor 164a–164d on the drive shaft 166a–166d of which is a pinion gear 168a–168d. Each pinion gear 168a–168d is engaged with a gear rack 170a–170d integrally formed on the outer surface of the adjacent secondary thrust nozzle 146a–146d and extending circumferentially thereof.

As in the case of the first described embodiment of the invention, primary thrust nozzle 116 functions as a plug for secondary thrust nozzles 146a–146d disposed around its periphery. Furthermore, when change in the flight direction of rocket motor 110 is desired, selected ones of the electric motors can be operated to rotate the secondary thrust nozzles 146a–146d connected thereto. Normally the secondary thrust nozzles are centered with respect to the adjacent gas expansion channel 128a–128d (i.e., each exit cone 162a–162d is equidistant from the side edges of the gas expansion channels). However, electric motors 164b and 164d can be operated, for example, to rotate secondary thrust nozzles 146b and 146d to the position thereof illustrated in FIGURE 5, whereupon rocket motor 110 will be turned upward. If rotor motor 110 is to be turned downwardly, secondary thrust nozzles 146b and 146d can be rotated away from the pitch axis. To turn rocket motor 110 to the left, secondary thrust nozzles 146a and 146c are rotated as illustrated in FIGURE 6, and movement of said rocket motor in the opposite direction is effected by rotating the same nozzles in the opposite direction. It will be apparent that pure roll control of rocket motor 110 can be accomplished by rotating any opposite pair of the secondary thrust nozzles 146a–146d either clockwise or counterclockwise.

The components of the third embodiment of the invention illustrated in FIGURE 7 correspond to those of the two above-described embodiments, the rocket motor 210 comprising, however, a single tubular casing 280 on the aft end of which is mounted a primary thrust nozzle 216 and four secondary thrust nozzles 226a–226d which are evenly spaced around said primary thrust nozzle. Primary thrust nozzle 216 is fixedly positioned on casing 280 and has a rearwardly convergent exterior surface. However, primary thrust nozzle 216 differs from the primary thrust nozzles 16, 116 of the other two embodiments of the invention in that its exterior surface is smooth, whereas the latter nozzles are provided with gas expansion channels 28, 128 respectively. Secondary thrust nozzles 226a–226d are identical in construction and mounting arrangements to secondary thrust nozzles 116a–116d of the preferred embodiment illustrated in FIGURES 3–6 except that their aerodynamic configuration is designed to provide the desired exit characteristics for gas expansion on the external surface of primary thrust nozzle 216. Therefore, roll and directional control of rocket motor 210 is accomplished as it is with rocket motor 110, namely, by rotating secondary thrust nozzles 226a–226d.

As mentioned hereinbefore, conventional rocket motors having multiple thrust nozzles do not provide optimum expansion of the thrust gas discharged therefrom during the trajectory spectrum of ambient pressure. A fixed geometry nozzle must be tailored to a fixed expansion ratio or exit Mach number. The standard procedure is to design this nozzle in such a fashion that it operates as closely as possible to optimum conditions for the maximum time of flight and thus maximizes missile performance. This design entails the operating conditions of overexpansion at low altitudes and underexpansion at high altitudes with the attendant thrust losses. A nozzle that utilizes a free jet boundary on one side and a fixed geometry on the other permits the nozzle to adjust to optimum expansion by ambient conditions. This type of nozzle can, therefore, be designed for the optimum expansion for the highest altitude or the lowest ambient pressure to be encountered in its flight and, thus, will expand the exhaust gases to their optimum Mach numbers at all times. In multiple thrust nozzle systems in accordance with the present invention, the centrally located primary thrust nozzle serves as a truncated plug for a plurality of secondary thrust nozzles disposed around it, thereby providing more efficient expansion of thrust gas than is attained by prior art multiple thrust nozzle arrangements. Furthermore, there is no problem of heating, as a result of base flow or recirculation, of the casing, or casings, on which the multiple thrust nozzles of the present invention are mounted, as there is in conventional multiple thrust nozzle designs. An additional important advantage of the various embodiments of the present invention is that they provide effective thrust vectoring directional control, as well as roll control, in lightweight, uncomplicated arrangements.

Obviously many modifications and variations of the present invention are possible in the light of the above teachings. For example, more than four secondary thrust nozzles can in some instances advantageously be spaced about the primary thrust nozzle. It is therefore to be understood that, within the scope of the appended claims, the invention can be practiced otherwise than as specifically described.

What is claimed is:

1. In a rocket motor, the combination comprising a primary thrust nozzle fixedly mounted on the aft end of said rocket motor and provided with a rearwardly convergent exterior surface, said surface having a plurality of gas expansion channels therein, and a plurality of secondary thrust nozzles disposed around said primary thrust nozzle and mounted on said rocket motor so that gas discharged therefrom is directed against said rearwardly convergent exterior surface of said primary thrust nozzle, said rearwardly convergent exterior surface forming a plug surface for expansion of said gas and said channels therein extending longitudinally of said primary thrust nozzle from a point adjacent a respective one of said secondary thrust nozzles.

2. The combination defined in claim 1 wherein each of said secondary thrust nozzles is mounted on said rocket motor for movement between first and second positions wherein gas discharged therefrom is respectively directed toward first and second points circumferentially spaced on said convergent exterior surface of said primary thrust nozzle, and including means carried by said rocket motor for selectively moving each of said secondary thrust nozzles between said first and second positions.

3. The combination defined in claim 1 wherein each of said secondary thrust nozzles is rotatable about an axis disposed substantially parallel to the longitudinal axis of said primary thrust nozzle and comprises a throat portion and an exit cone disposed at an angle to said throat portion, and including means carried by said rocket motor for selectively rotating each of said secondary thrust nozzles.

4. The combination defined in claim 1 wherein said primary thrust nozzle comprises an inner wall which forms a convergent-divergent thrust nozzle and an outer wall which defines said rearwardly convergent surface, the ends of said walls being joined to thereby provide a closed annular chamber in said primary thrust nozzle.

5. The combination defined in claim 4 wherein said chamber contains a fluid, and including means carried by said primary thrust nozzle for selectively injecting said fluid into the gas discharge passage of said primary thrust nozzle at different points spaced around said inner wall.

6. The combination defined in claim 4 including a flexible, annular bladder disposed within said chamber, a plurality of circumferentially spaced injection passages formed in said inner wall and communicating with the interior of said bladder, means carried by said rocket motor for applying pressure upon said bladder, and valve means mounted on said inner wall for selectively opening and closing each of said injection passages, whereby fluid contained in said bladder can be selectively injected into the gas discharge passage of said primary thrust nozzle to thereby vary the thrust vector of said rocket motor.

References Cited

UNITED STATES PATENTS

| 2,995,319 | 8/1961 | Kershner et al. | 60—232 X |
| 3,058,489 | 10/1962 | Corbett | 60—232 X |
| 3,094,072 | 6/1963 | Parilla. | |
| 3,101,591 | 8/1963 | Wise | 60—231 |
| 3,188,024 | 6/1965 | Sehneider | 239—265.35 X |
| 3,300,978 | 1/1967 | Pennington | 239—265.23 X |
| 3,314,609 | 4/1967 | Horgan et al. | 239—265.25 |
| 3,358,453 | 12/1967 | Swet | 60—232 X |

FOREIGN PATENTS 960,106  6/1964  Great Britain.

EVERETT W. KIRBY, *Primary Examiner.*

U.S. Cl. X.R.

239—265.23, 265.35